United States Patent
Schramm et al.

(10) Patent No.: US 6,261,060 B1
(45) Date of Patent: Jul. 17, 2001

(54) HYDRODYNAMIC TORQUE CONVERTER WITH A RECEPTACLE ON THE CONVERTER CASING

(75) Inventors: Friedrich Schramm, Schonungen-Forst; Karel Kriz, Poppenhausen; Werner Spohn, Dittelbrunn; Roland Illig, Heustreu, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/412,958

(22) Filed: Oct. 5, 1999

(30) Foreign Application Priority Data

Oct. 5, 1998 (DE) .............................................. 198 45 687

(51) Int. Cl.⁷ ..................................................... F01D 25/28
(52) U.S. Cl. ..................................... 415/213.1; 415/214.1
(58) Field of Search .............................. 415/213.1, 214.1, 415/215.1; 416/180, 197 C; 29/889.2, 889.5, 34 R; 60/330

(56) References Cited

U.S. PATENT DOCUMENTS

| | | | |
|---|---|---|---|
| 3,625,323 | * 12/1971 | Hetmann | 192/3.26 |
| 3,891,350 | * 6/1975 | Adachi et al. | 416/180 |
| 5,215,173 | * 6/1993 | Gimmler | 192/3.3 |
| 5,480,012 | 1/1996 | Polubinski | 192/3.29 |
| 5,813,505 | 9/1998 | Olsen | 192/3.28 |
| 6,099,435 | * 8/2000 | Halene et al. | 477/62 |

FOREIGN PATENT DOCUMENTS

| | | | |
|---|---|---|---|
| 32 22 119 | 10/1983 | (DE) | F16D/3/06 |
| 41 21 586 | 1/1993 | (DE) | F16H/45/02 |
| 198 22 665 | 12/1998 | (DE) | F16H/41/00 |
| 198 10 297 | 9/1999 | (DE) | F16H/41/24 |
| 199 10 049 | 9/1999 | (DE) | F16H/45/02 |
| 299 11 867 | * 12/1999 | (DE) | F16H/45/02 |
| 0 333 953 | 9/1989 | (EP) | F16H/5/00 |
| 06221401 | 8/1994 | (JP) | F16H/41/24 |

\* cited by examiner

*Primary Examiner*—Edward K. Look
*Assistant Examiner*—Ninh Nguyen
(74) *Attorney, Agent, or Firm*—Cohen, Pontani, Lieberman & Pavane

(57) ABSTRACT

A hydrodynamic torque converter includes a converter casing with a support connected on the drive side of the casing. The support includes a receptacle for receiving a connecting element for fastening the converter casing to a component of a drive. The receptacle is formed via an extrusion extending essentially at a right angle to the extension direction of the support and includes an annular collar surrounding a recess.

3 Claims, 2 Drawing Sheets

HYDRODYNAMIC TORQUE CONVERTER WITH A RECEPTACLE ON THE CONVERTER CASING

BACKGROUND OF THE INVENTION

1. Field of the Invention

The invention relates to a casing for a hydrodynamic torque converter with a support fastened to the drive end of the converter casing, the support having a receptacle for receiving a connecting element for fastening the converter casing to a component of a drive.

2. Description of the Related Art

A prior art hydrodynamic torque converter is disclosed in German reference DE 41 21 586 A1. FIG. 1 of that reference shows a receptacle at the drive end for receiving a connecting element for fastening the converter casing to a component of a drive. The receptacle is formed by a threaded sleeve with an internal thread. The receptacle is arranged on a support fastened on the converter casing by welding. A threaded connecting element such as a bolt is normally screwed into the threaded sleeve and also penetrates an opening in a plate which is fastened radially further inward on the respective drive such, for example, as on the crankshaft of an internal combustion engine. An example of such a plate which is connected to a crankshaft is disclosed in FIG. 1 of German reference DE 32 22 119 C1. The converter casing is fastened in this way on the drive, the plate mentioned being regarded as a component of the drive.

Referring back to German reference DE 41 21 586 A1, it should be noted that the fastening of such a threaded sleeve on the respective support, preferably by means of welds, is relatively expensive in terms of manufacture and material. In addition, cutting the thread in this threaded sleeve cuts the grain structure of the sleeve material and therefore reduces the strength of the threaded sleeve. To compensate for this disadvantage, the wall thickness of the threaded sleeve is increased, which undesirably increases the weight of the converter casing.

SUMMARY OF THE INVENTION

An object of the present invention is to provide a receptacle on a converter casing for receiving a connecting element for connecting the converter casing to a drive such that the receptacle provides optimum strength while minimizing material and manufacturing expenses.

This object is achieved by a hydrodynamic torque converter connectable to a component of a drive, comprising a converter casing having radial flange portion on a drive side of the hydrodynamic torque converter, a support extending along an extension direction and fastened to the converter casing on the drive side of the radial flange such that said extension direction of said support is in a radial direction relative to said converter casing, said support having a receptacle for receiving a connecting element for fastening the converter casing to the component of the drive, wherein said receptacle comprises an extrusion of said support extending essentially at a right angle to an extension direction of said support and having an annular collar surrounding a recess.

The arrangement of the receptacle as an extrusion from the support permits the extrusion to be manufactured integrally with the rest of the support. Accordingly, no additional connections of the receptacle to the support are necessary to produce a connection. The wall thickness of the collar of the receptacle formed in this way is essentially determined by the wall thickness of the support.

If the collar extends essentially at a right angle to the support, a sleeve is formed with a sufficient length in the axial direction so that any given connecting element obtains good guidance. The connecting element received by the receptacle may, for example, be formed by a rivet but is also preferably conceivable as a bolt. If a bolt is to be used as the connecting element, the inside of the receptacle is provided with a thread.

Because the receptacle is configured as an extrusion in the support, work-hardening occurs during the manufacture of the collar so that even a small wall-thickness of the collar suffices for the production of a high-strength receptacle. If the receptacle requires threads, the threads are produced on the inner surface of the collar by pressing or rolling so that a further compaction of the grain structure of the material is achieved without cutting through this grain structure, to further exploit the advantage provided by the work hardening. The high strength achievable by the above arrangement minimizes the required amount of material so that the receptacles can be configured to have a very low mass.

An advantageous method of manufacturing the receptacle according to the invention is also given in the claims.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote simulate elements throughout the several views.

DETAILED DESCRIPTION OF THE PRESENTLY PREFERRED EMBODIMENTS

Figure 1:
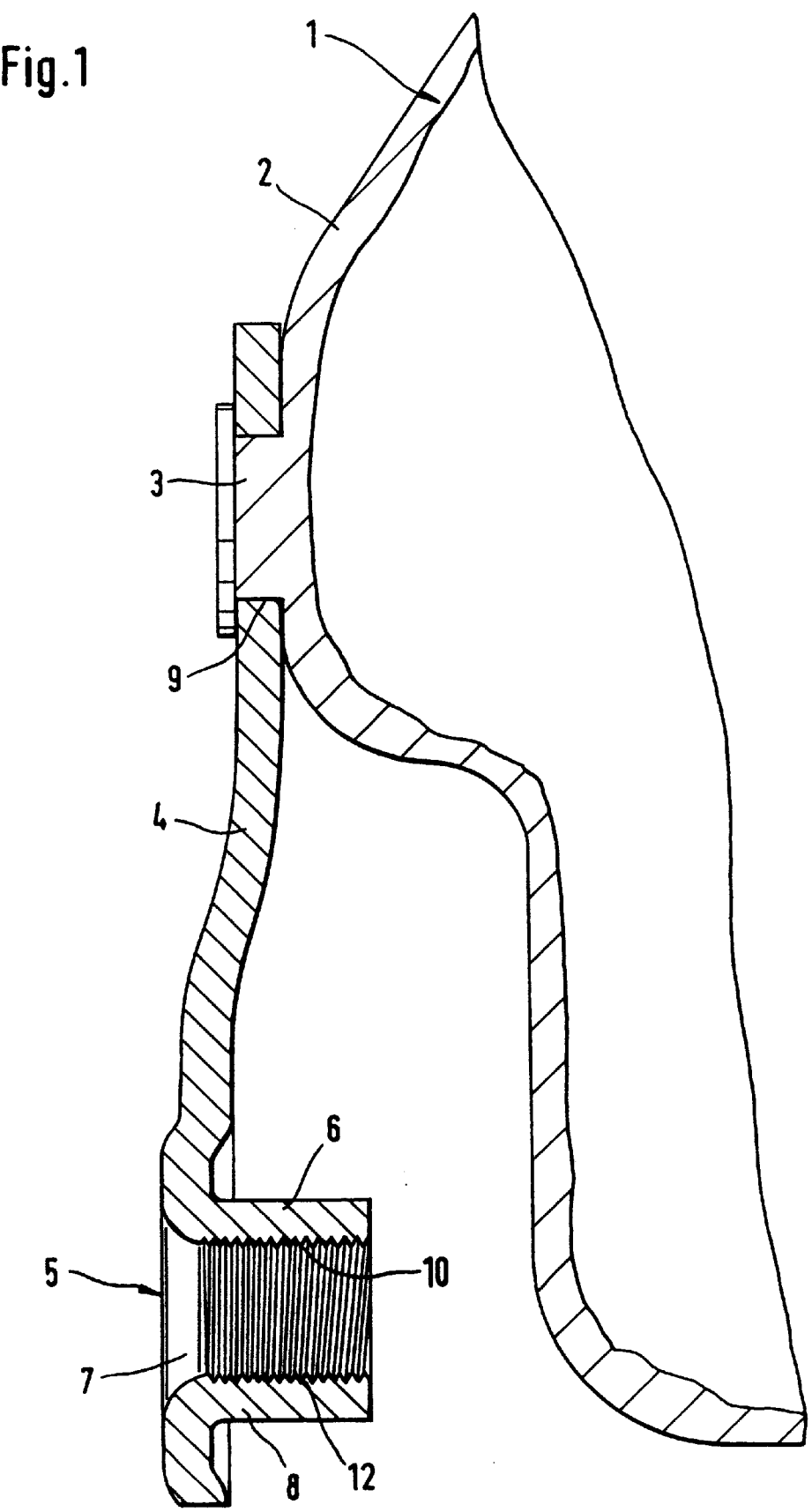
FIG. 1 is a partial longitudinal sectional view of a lower portion of a converter casing with a support having a receptacle in accordance with an embodiment of the present invention.

FIG. 1 shows part of a converter casing 1 of a hydrodynamic torque converter according to the present invention in which a bottom section of a wall of a drive-end radial flange 2 is shown. The drive end of the radial flange 2 has a pressed-out rivet 3 which passes through a corresponding opening 9 in a support 4. The pressed-out rivet 3 fastens the support 4 to the radial flange 2 by a riveting procedure. The support 4 has an annular shape with a receptacle 5 arranged in a radially outer region. The receptacle 5 is formed by an extrusion 6 toward the converter casing 1. The extrusion 6 produces a collar 8 having a recess 7 and extending essentially at a right angle to the support 4 toward the converter casing 1. A thread 12 is arranged on an inner surface 10 in the recess 7 of the collar 8. The thread 12 is manufactured by pressing or rolling on the inner surface 10 to help facilitate high strength in the collar 8. The manufacture of the collar 8 by the extrusion process compacts the grain structure of collar 8 which is further compacted by the pressing or rolling of the thread 12.

Figure 2:
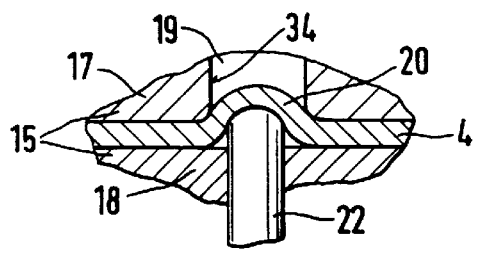
FIG. 2 is a view of the support during a manufacturing step for the receptacle showing the formation of a deformation.

The manufacture of the receptacle 5 is depicted in accordance with FIGS. 2 to 6. In FIG. 2, the region of the support 4 in which the receptacle is to be formed is marked out and clamped axially between and upper part 17 and a lower part 18 of a workpiece carrier 15. The lower part 18 of the workpiece carrier 15 in FIG. 2 has an opening for a punch 22 which is positioned on the lower surface of the support 4. A cylindrical relief area 19 having a wall 34 is provided in the upper part 17 of the workpiece 15 on the opposite side of the support 4. The relief 19 is configured to be sufficiently large so that the outer diameter of the receptacle 5 to be formed can enter the wall 34 of this relief 19. A deformation 20 of the support 4 into the relief 19, as shown in FIG. 2, is generated by the application of a pressure force on the punch 22 directed toward the support 4.

As soon as the deformation 20 is present, the punch 22 is withdrawn from the support 4 and the beam 4 is placed on a pedestal 24 having a shape matched to the corresponding side of the deformation 20. The pedestal 24 has a central hole 26 which is directed towards a deformation center 28 of the deformation 20. A pin 30 is placed on the deformation 20 on a side of the support 4 opposing the pedestal 24, i.e. from the top in FIG. 3, and is in fact placed at the deformation center 28. A perforation 31 in the deformation center 28 of the deformation 20 is then produced by the pin 30.

Figure 3:
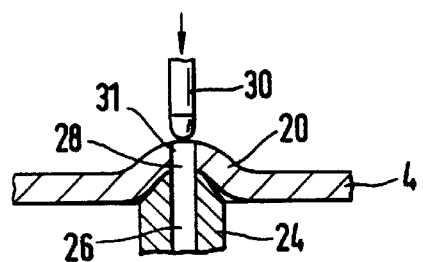
FIG. 3 is a view of the support during a manufacturing step showing a perforation in the deformation.
Figure 4:
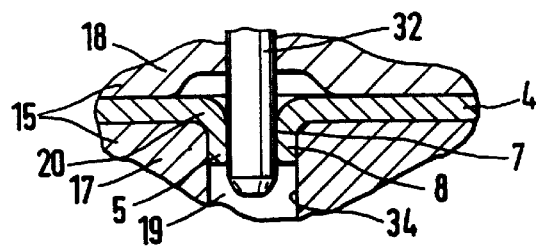
FIG. 4 is a view of the support during a manufacturing step showing an extrusion of the deformation.
Figure 5:
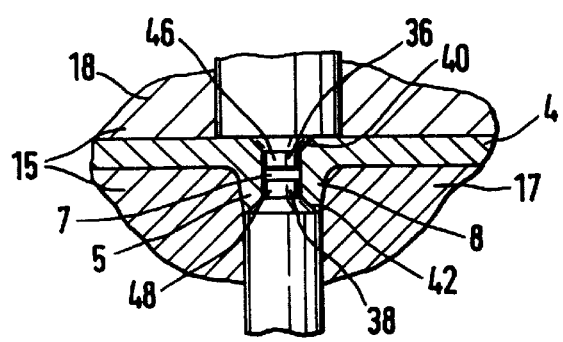
FIG. 5 is a view of the support during a manufacturing step showing a coining of chamfers in the receptacle.
Figure 6:
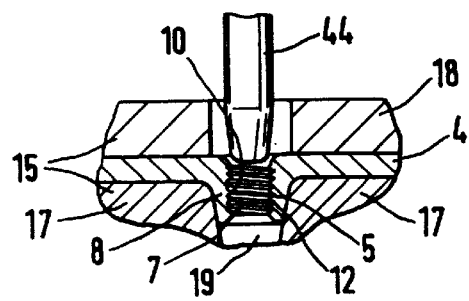
FIG. 6 is a view of the support during a manufacturing step showing a thread being pressed into the receptacle.

In FIGS. 4 to 6, the upper and lower parts 17, 18 of the workpiece carrier 15 are respectively shown in an reversed positions relative to FIGS. 2 and 3. This depiction facilitates description of the following manufacturing steps. Referring to FIG. 4, an arbor 32 is pushed into the perforation 31 from the side of the lower part 18 of the workpiece carrier 15. As the arbor 32 is pushed into the perforation 31, the deformation 20 is drawn into the relief 19 by an extrusion process. As a consequence, the radially outer dimension of the collar 8 produced from the deformation 20 is formed by the wall 34 of the relief 19 and the radially inner dimension of the collar 8 is formed by the arbor 32. The material grain structure in this collar 8 is compressed and its strength is therefore increased during this extrusion process. As soon as the arbor 32 is withdrawn, plungers 36, 38 are moved in mutually opposite directions from both sides of the support 4 so that these plungers 36, 38 form chamfers 40, 42 on both sides of the collar 8, and therefore of the receptacle 5. Because, in this process, the plungers 36, 38 engage in the recess 7 by means of their mutually facing cylindrical ends 46, 48, they support the collar 8 on its radially inner surface while they form the chamfers 40, 42.

As soon as the plungers 36, 38 are then withdrawn from the support 4, the receptacle 5 on the support 4 is fundamentally finished. It can then be used for connection to a component of a drive by a connecting element such, for example, as a rivet. If the connecting element is to be formed as a bolt, the receptacle 5 requires a thread 12 on the inner surface 10 of the collar 8. A threaded pin 44 shown in FIG. 6 may be introduced into the recess 7 of the collar 8 and the thread 12 on the inner surface 10 of the collar 8 is formed by pressing or rolling. The threaded pin 44 is subsequently removed from the support 4 and extracted from the workpiece 10 carrier 15. The support 4 manufactured in this way can then be fastened to the converter casing 1 by the pressed-out rivet 3 in the radial flange 2 of the converter casing 1.

The invention is not limited by the embodiments described above which are presented as examples only but can be modified in various ways within the scope of protection defined by the appended patent claims.

We claim:

1. A hydrodynamic torque converter connectable to a component of a drive, comprising:

a converter casing having a radial flange portion on a drive side of the hydrodynamic torque converter; and a support extending along an extension direction and fastened to said radial flange on the drive side of the converter casing such that said extension direction of said support is in a radial direction relative to said converter casing, said support having a receptacle for receiving a connecting element for fastening the converter casing to the component of the drive, wherein said receptacle comprises an extrusion of said support extending essentially at a right angle to an extension direction of said support and having an annular collar surrounding a recess, wherein an inner surface of said annular collar comprises a thread, and wherein said thread is made by a process including one of pressing and rolling into said annular collar.

2. A method of manufacturing a receptacle for a converter casing of a hydrodynamic torque converter, the receptacle being configured for receiving a connecting element for fastening the converter casing on a drive and the receptacle being arranged on a support fastened to the converter casing, said method comprising the steps of:

(a) axially clamping the support between two parts of a multi-part workpiece carrier, wherein at least one part of the two parts includes a cylindrical relief area in a region in which the receptacle is to be formed;

(b) forming a deformation on the support into the cylindrical relief area of the at least one part of the workpiece carrier using a tool punch by exerting a pressure force on the tool punch on a side of the support opposing the relief;

(c) placing the support on a pedestal such that the deformation formed in said step (b) is placed on and matches the shape of the pedestal, the pedestal having a central hole arranged essentially at a right angle to the support;

(d) perforating a center of the deformation after the support is placed on the pedestal using a pin which is coaxially moveable relative to the central hole of the pedestal, thereby forming a perforation through the deformation;

(e) extruding a collar of the receptacle out of the deformation by penetrating the perforation formed in said step (d) with an arbor which is arranged and is movable at a right angle to the support such that the collar is formed in the cylindrical relief area between a wall surrounding the cylindrical relief area and the arbor to form a recess within the collar; and (f) introducing plungers on opposing sides of the collar to form a chamfer at each end of the collar formed in said step (e).

3. The method of claim 2, further comprising the step of introducing a threaded pin into the recess of the collar and pressing or rolling a thread on the inside of the collar using the threaded pin.

* * * * *